United States Patent
Kurihara et al.

(10) Patent No.: US 6,516,359 B1
(45) Date of Patent: Feb. 4, 2003

(54) INFORMATION PROCESSING METHOD AND APPARATUS, AUTOMOTIVE INFORMATION SYSTEM AND METHOD OF CONTROLLING THE SAME, AND STORAGE MEDIUM ON WHICH AN INFORMATION PROCESSING PROGRAM IS STORED

(75) Inventors: Nobuhiro Kurihara, Tokyo (JP); Takao Kurihara, Tokto (JP); Nagatoshi Uehara, Tokyo (JP)

(73) Assignee: Clarion Co., Ltd., Saitame-ken (JP)

( * ) Notice: Subject to any disclaimer, the term of this patent is extended or adjusted under 35 U.S.C. 154(b) by 0 days.

(21) Appl. No.: 09/301,283

(22) Filed: Apr. 28, 1999

(30) Foreign Application Priority Data

Apr. 28, 1998 (JP) .......................................... 10-119126

(51) Int. Cl.⁷ ............................................. G06F 13/14
(52) U.S. Cl. ......................... 710/52; 710/63; 710/101; 710/129; 709/219
(58) Field of Search ............................ 710/52, 63, 72, 710/101, 129; 709/219

(56) References Cited

U.S. PATENT DOCUMENTS

| | | | | |
|---|---|---|---|---|
| 4,392,021 A | * | 7/1983 | Slate ........................ 179/1.5 R |
| 4,413,289 A | | 11/1983 | Weaver et al. |
| 4,860,193 A | * | 8/1989 | Bentley et al. ............. 364/200 |
| 4,931,924 A | * | 6/1990 | Kageura ..................... 364/200 |
| 5,134,563 A | * | 7/1992 | Tayler et al. ............... 711/143 |
| 5,146,576 A | * | 9/1992 | Beardsley et al. .......... 711/113 |
| 5,265,081 A | | 11/1993 | Shimizume et al. |
| 5,388,209 A | | 2/1995 | Akagiri |
| 5,566,315 A | * | 10/1996 | Milillo et al. ............... 711/113 |
| 5,687,316 A | * | 11/1997 | Graziano et al. .............. 395/2 |
| 5,696,991 A | * | 12/1997 | Chang ......................... 710/52 |
| 5,731,770 A | * | 3/1998 | Minoda ....................... 341/61 |
| 5,778,420 A | * | 7/1998 | Shitara et al. .............. 711/113 |
| 5,944,802 A | * | 8/1999 | Bello et al. .................. 710/52 |
| 5,958,027 A | * | 9/1999 | Gulick ........................ 710/52 |
| 6,029,194 A | * | 2/2000 | Tilt ............................ 709/219 |
| 6,151,359 A | * | 11/2000 | Acer et al. .................. 375/240 |

FOREIGN PATENT DOCUMENTS

| | | |
|---|---|---|
| EP | 265809 | 5/1988 |
| EP | 658011 | 6/1995 |
| EP | 684606 | 11/1995 |
| EP | 816172 | 1/1998 |
| WO | 9723114 | 6/1997 |

* cited by examiner

*Primary Examiner*—Jeffrey Gaffin
*Assistant Examiner*—Abdelmoniem Elamin

(57) ABSTRACT

An information processing apparatus having a device which processes data at a rate exactly adjusted relative to the rate of a data supplying device without requiring a common clock signal. A writing unit writes data into a buffer memory. When a first half of the buffer memory has become filled with data, a starter makes a reading unit start reading data from the buffer memory. A writing time measurement unit and a reading time measurement unit respectively measure the writing time required to write data in the buffer memory and the reading time required to read data from the buffer memory starting from the first storage location to the exact middle storage location of the buffer memory. A controller controls the rate at which data is read from the buffer memory based on the relationship between the writing time and the reading time.

8 Claims, 4 Drawing Sheets

INFORMATION PROCESSING METHOD AND APPARATUS, AUTOMOTIVE INFORMATION SYSTEM AND METHOD OF CONTROLLING THE SAME, AND STORAGE MEDIUM ON WHICH AN INFORMATION PROCESSING PROGRAM IS STORED

BACKGROUND OF THE INVENTION

1. Field of the Invention

The present invention relates to an improved information processing technique, and more specifically, to an information processing technique which allows both a device which supplies data and a device which processes data to operate at the same rate without having to have a common clock signal.

2. Description of the Related Art

In recent years, with the advance in semiconductor technology, information processing equipment for processing information using an electronic circuit is becoming increasingly popular. An example of information processing equipment is an automotive information system such as a car audio system. In a typical car audio system, a disk playback device serving as a device for supplying data reads audio data representing a sound waveform from a recording medium such as a CD, and a device for processing data such as a digital sound processor or a D/A converter processes the received audio data to reproduce a sound signal.

The car audio system is also called a car stereo system. A typical car audio system is designed to give an acoustic output into a car room by driving a loudspeaker with an amplifier in accordance with a sound signal supplied from an AM/FM tuner, a cassette tape deck, a disk playback device such as a CD player or MD player, or an auto CD changer.

In some cases, a car audio system is combined with an electronic device realized by advanced semiconductor technology, such as a car navigation system, a mobile telephone, a voice recognition system, etc. In the following description, such a mixed system is also called an automotive information system.

In the present invention, the term "audio data" is used to describe data representing sound information such as music. On the other hand, the term "digital data" is used to describe data in digital form such as character codes, numeric codes, etc.

The disk playback device is a device which reads audio data or digital data from a storage medium such as a CD. CDs used together with the disk playback device can be generally classified into two groups: music CDs on which audio data is stored; and CD-ROMs on which digital data is stored. Herein, reading audio data from a music CD and reading digital data from a CD-ROM are both called "playback".

In the information processing system, the processing of data is required, in some cases, to be performed at the same rate as the rate at which data is supplied, as is the case with reproduction of an audio signal from audio data. For example, in the case where audio data read from a music CD in a data supplying device is stored in a buffer, and a data processing device reproduces an audio signal by reading audio data from the buffer, if there is a difference in operation speed between the data supplying device and the data processing device, the data can overflow the buffer before being processed or a break of sound can occur because of a too-slow rate at which data is read.

Conventionally, to prevent the above-described problems, a data supplying device such as a disk playback device and a data processing device such as a digital sound processor are disposed in a single unit and a common clock signal is used. This limits the construction of the system and thus it is difficult to flexibly combine various separate units into a system.

In view of the above-described problems, it is an object of the present invention to provide a technique which allows a data processing device to operate at the same rate as that of a data supplying device without having to have a common clock signal. It is another object of the present invention to provide a technique of easily controlling the data processing rate in a highly reliable fashion by means of a simple method.

SUMMARY OF THE INVENTION

According to a first aspect of the invention, to achieve the above objects, there is provided an information processing apparatus including a buffer for storing given data; writing means for writing data into a buffer; reading means for reading data from the buffer; and starting means for making the reading means start reading data when data has been written into the buffer such that the first half storage area of the buffer has become filled with the data.

In this information processing apparatus, when the first half storage area of the buffer becomes filled with data written therein, a reading operation is begun starting from the first storage location of the buffer. This allows the distance between the data writing location and the data reading location to have a maximum possible value equal to a half the full storage capacity of the buffer, thereby minimizing the probability that some data is lost by a delay in supplying data and probability that the buffer overflows with data due to a change in the writing speed or reading speed.

According to a second aspect of the invention, there is provided an information processing apparatus including a buffer for storing given data; writing means for writing data into a buffer; reading means for reading data from the buffer; and control means for controlling the rate at which data is read from the buffer, in accordance with the rate at which data is given.

According to a ninth aspect of the invention, there is provided an automotive information system, based on the second aspect of the invention described above, wherein the system includes a disk playback device for supplying audio data and a main unit for processing the audio data supplied, wherein the main unit includes a buffer for storing given data; writing means for writing audio data into a buffer; reading means for reading audio data from the buffer; and control means for controlling the rate at which the audio data is read from the buffer, in accordance with the rate at which the audio data is given.

According to a third aspect of the invention, there is provided an information processing apparatus including a buffer for storing given data; writing means for writing data into a buffer; reading means for reading data from the buffer; and control means for controlling the rate at which data is read from the buffer, in accordance with the relationship between the rate at which data is given and the rate at which the data is being read from the buffer.

In the second, ninth, and third aspects of the invention, data is read from the buffer at a rate exactly adjusted relative to the rate at which data is supplied to the buffer regardless of a difference in operation speed, caused by for example a difference in clock signal, between the device which supplies data and the device which processes data. That is, when the device for supplying data and the device for processing data are constructed separately from each other, the invention makes it possible for the data processing device to operate at the same rate as that of the data supplying device.

According to a fourth aspect of the invention, there is provided an information processing apparatus including a buffer for storing given data; writing means for writing data into a buffer; reading means for reading data from the buffer; starting means for making the reading means start reading data when data has been written into the buffer such that the first half storage area of the buffer has become filled with the data; writing time measuring means for measuring the writing time required to write data into the buffer starting from the first storage location to the exact middle storage location of the buffer; reading time measuring means for measuring the time required to read the data from the buffer starting from the first storage location to the exact middle storage location of the buffer; and control means for controlling the rate at which data is read from the buffer, in accordance with the relationship between the writing time and the reading time.

According to a seventh aspect of the invention, there is provided a method of processing data corresponding to the apparatus according to the fourth aspect of the invention described above, wherein the method includes the steps of writing given data into a buffer; reading data from the buffer; making the reading step start reading data when data has been written into the buffer such that the first half storage area of the buffer has become filled with the data; measuring the writing time required to write data into the buffer starting from the first storage location to the exact middle storage location of the buffer; measuring the reading time required to read the data from the buffer starting from the first storage location to the exact middle storage location of the buffer; and controlling the rate at which data is read from the buffer, in accordance with the relationship between the writing time and the reading time.

According to a twelfth aspect of the invention, there is provided a storage medium on which an information processing program used by a computer to perform an information process, based on the fourth or seventh aspect of the invention described above is stored, wherein the process includes the steps of writing given data into a buffer; starting reading data from the buffer when data has been written into the buffer such that the first half storage area of the buffer has become filled with the data; measuring the writing time required to write data into the buffer starting from the first storage location to the exact middle storage location of the buffer; measuring the reading time required to read the data from the buffer starting from the first storage location to the exact middle storage location of the buffer; and controlling the rate at which data is read from the buffer, in accordance with the relationship between the writing time and the reading time.

According to a tenth aspect of the invention, based on the fourth aspect of the invention described above, there is provided an automotive information system including a disk playback device for supplying audio data and a main unit for processing the audio data supplied, wherein the main unit includes a buffer for storing given data; writing means for writing audio data received from the disk playback device into the buffer; reading means for reading audio data from the buffer; starting means for making the reading means start reading data when audio data has been written into the buffer such that the first half storage area of the buffer has become filled with the audio data; writing time measuring means for measuring the writing time required to write audio data into the buffer starting from the first storage location to the exact middle storage location of the buffer; reading time measuring means for measuring the time required to read the audio data from the buffer starting from the first storage location to the exact middle storage location of the buffer; and control means for controlling the rate at which audio data is read from the buffer, in accordance with the relationship between the writing time and the reading time.

According to an eleventh aspect of the invention, there is provided a method, corresponding to the system according to the tenth aspect of the invention, for controlling an automotive information system with a disk playback device for supplying audio data and with a main unit for processing the audio data supplied, wherein the method performs, in the main unit, a process including the steps of writing audio data received from the disk playback device into a buffer; reading audio data from the buffer; starting reading data from the buffer when audio data has been written into the buffer such that the first half storage area of the buffer has become filled with the audio data; measuring the writing time required to write audio data into the buffer starting from the first storage location to the exact middle storage location of the buffer; measuring the reading time required to read the audio data from the buffer starting from the first storage location to the exact middle storage location of the buffer; and controlling the rate at which audio data is read from the buffer, in accordance with the relationship between the writing time and the reading time.

In the fourth, seventh, twelfth, tenth, and eleventh aspects of the invention, data is read from the buffer at a rate exactly adjusted relative to the rate at which data is supplied to the buffer regardless of a difference in operation speed, caused by for example a difference in clock signal, between the device which supplies data and the device which processes data. That is, when the device for supplying data and the device for processing data are constructed separately from each other, the invention makes it possible for the data processing device to operate at the same rate as that of the data supplying device. The timing of starting to read data is determined in such a simple manner that when data has been written into the buffer such that the first half storage area has become filled with the data, reading data from the buffer is started. Furthermore, the rate at which data is processed is controlled on the basis of the times required to write and read the same amount of data.

According to a fifth aspect of the invention, there is provided an information processing apparatus based on any of the second to fourth aspects described above, wherein the control means controls the above-described rate by dividing the given clock by a divisor in such a manner that when the rate at which data is written into the buffer is lower than the rate at which data is read from the buffer, the clock is divided by a reduced divisor but the clock is divided by an increased divisor when the rate at which data is written into the buffer is higher than the rate at which data is read from the buffer.

According to an eighth aspect of the invention, there is provided a method of processing information based on the seventh aspect describe above, wherein the rate controlling step controls the above-described rate by dividing the clock by a divisor in such a manner that when the rate at which data is written into the buffer is lower than the rate at which data is read from the buffer, the clock is divided by a reduced divisor but the clock is divided by an increased divisor when the rate at which data is written into the buffer is higher than the rate at which data is read from the buffer.

According to the fifth and eighth aspects of the invention, it becomes possible to easily control the processing rate by simply increasing or reducing the divisor by which the clock signal is divided.

According to a sixth aspect of the invention, there is provided an information processing apparatus based on any of first to fifth aspects described above, wherein at least one of the operation of writing data and the operation of reading data is performed by means of DMA.

According to the sixth aspect of the invention, it becomes possible to read and write data from and to the buffer memory at a high rate by means of direct memory access (DMA). This makes it possible to process, in a highly reliable fashion, a large amount of data per unit time, such as audio data read from a music CD, received from another unit via a cable.

DESCRIPTION OF THE PREFERRED EMBODIMENT

Figure 1:
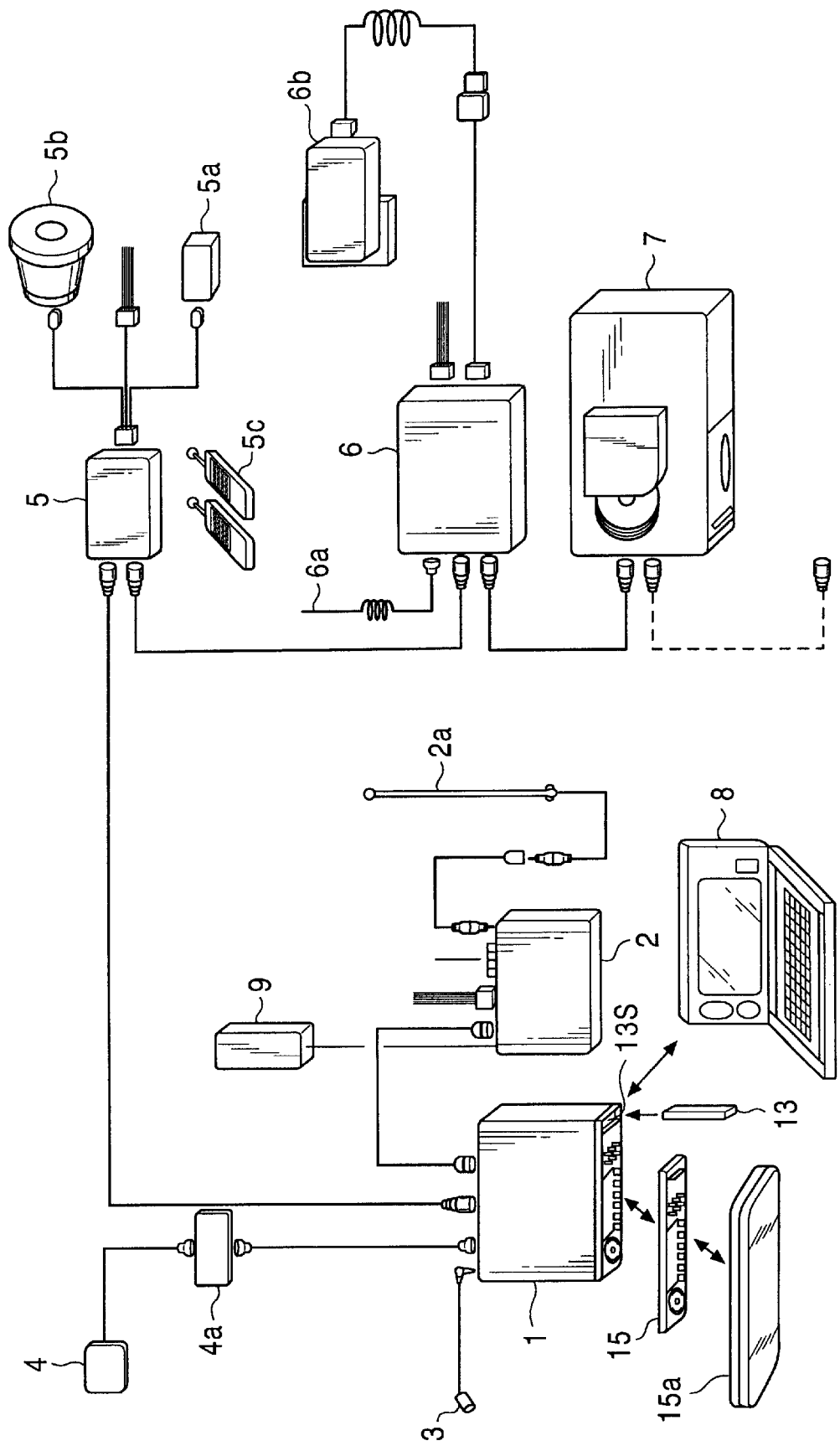
FIG. 1 is a block diagram illustrating the general construction of an embodiment of the invention.

The present invention is described in further detail below with reference to preferred embodiments in conjunction with the accompanying drawings. In figures referred to in the following description, elements similar to those in any previous figure are denoted by similar reference numerals and duplicated descriptions are not given.

The present embodiment is realized with various hardware devices and a computer which is controlled by software. The software may include a set of commands according to the invention. The present embodiment may also include a part based on the conventional technique described above. In addition to a program code, the software may also include data used by the computer to execute the program code. The software may involve various processes associated with not only audio devices but also various other physical devices such as a CPU and chip sets, etc., so as to realize the advantages and features of the invention.

The hardware and software may be modified in various ways. For example, depending on the circuit configuration and the processing capacity of the CPU, some function of the invention may be implemented with software rather than with a physical electronic circuit such as an LSI. Furthermore, when some function is realized using software, the software in various forms such as a compiler, assembler, microprogram, etc., may be employed. A storage medium itself such as a CR-ROM on which software or a program used to embodying the present invention is stored also falls within the scope of the invention.

As described above, the present invention may be implemented in various manners, and thus the invention is described below with reference to preferred embodiments in which virtual circuit blocks are used to implement various functions.

1. Construction 1.1. General Construction

FIG. 1 is a block diagram illustrating the general construction of an embodiment of the invention. As shown in FIG. 1, the automotive information system according to the present embodiment of the invention includes a main unit 1, a tuner/amplifier unit 2, a microphone 3, a GPS antenna 4, security control unit 5, a telephone unit 6, an auto CD-ROM changer 7, and an auxiliary backup battery 9.

The main unit 1 includes a computer for controlling the operation over the entire system. Although not shown in FIG. 1, in addition to an AM/FM antenna 2a, the tuner/amplifier unit 2 includes a radio tuner and an amplifier for driving a loudspeaker. The microphone 3 is used to input a voice command issued by a user so that the operation is performed according to the voice command by means of voice recognition. The voice recognition is accomplished by the computer according to the program.

Of these components, the tuner/amplifier unit 2, the microphone 3, the GPS antenna 4, the security control unit 5, the telephone unit (mobile telephone) 6, and the auto CD-ROM changer 7 serve to provide at least one of audio data and digital data.

For example, when the main unit 1 reproduces an audio signal from audio data read from a music CD in the auto CD-ROM changer 7, the auto CR-ROM changer 7 serves as the data supplying device and the main unit 1 serves as the data processing device. However, because the auto CD-ROM changer 7 and the main unit 1 are constructed in the form of units separated from each other, their operation timing is determined on the basis of different clock signals.

1.1.1. Daisy Chain Connection

The security control unit 5, the telephone unit 6, and the auto CD-ROM changer 7 are connected to the main unit 1 via a USB (Universal Serial Bus) line. The USB is a serial bus serving to connect a plurality of devices in a daisy chain fashion.

In the present embodiment, those devices connected to the main unit 1 via the USB may transmit and receive data via the USB. For example, the auto CD-ROM changer 7 has an upstream and downstream hubs so that audio data or digital data read from a music CD or a CD-ROM is converted into an ATAPI format, which is one of parallel formats, by an ATAPI decoder in the auto CD-ROM changer 7 and is further converted by a controller into a USB (Universal Serial Bus) format which is one of serial formats, and finally transmitted over the USB line.

This serial connection technique allows the units 5, 6 and the auto CR-ROM changer 7 to be connected easily even when they are disposed at locations separated far from the main unit 1. In FIG. 1, the connection is made in the order unit 5, unit 6, and auto CD-ROM changer 7. However, the connection order is set in an arbitrary fashion. Furthermore, devices connected in such a manner may be arbitrarily selected as required.

1.1.2. Auto CD-ROM Changer

Figure 2:
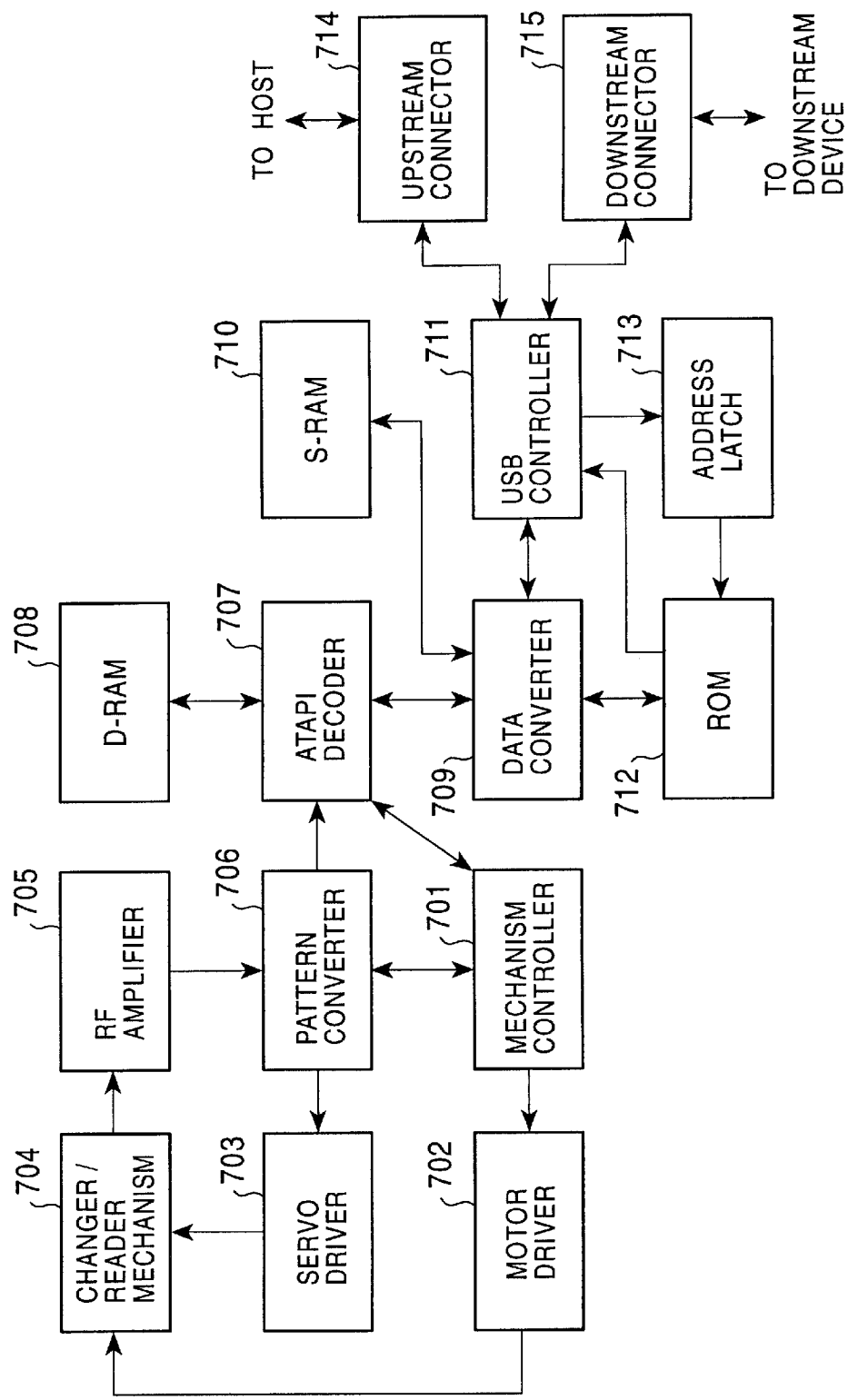
FIG. 2 is a block diagram illustrating the construction of an auto CD-ROM changer according to an embodiment of the invention.

FIG. 2 illustrates a typical construction of the auto CD-ROM changer 7 employed in the present embodiment as the data supplying device. The auto CD-ROM changer 7 serves to automatic exchange a plurality of music CDs or CD-ROMs and read, in response to a command received via the USB line, audio data from a music CD or digital data from a CD-ROM. The resultant data is output via the USB line.

More specifically, the auto CR-ROM changer 7 includes a mechanism controller 701, a motor driver 702, a servo driver 703, a changer/reader mechanism 704, an RF amplifier 705, and a pattern converter 706. The auto CR-ROM changer 7 is constructed with these components such that audio data can be read from a music CD and digital data can be read from a CD-ROM.

The ATAPI decoder 707 converts data read from a CD to data in the ATAPI format, whether the data is audio data or digital data. The USB controller 711 transfers both output data converted from audio data and output data converted from digital data to the main unit 1 in an isochronous fashion via the same USB interface.

1.1.3. Main Unit

The main unit 1 includes a socket 13S for inserting a compact flash card 13 therein and a removable face plate unit 15 (FIG. 1). The compact flash cart 13 is a storage medium using a flash memory. When the compact flash card 13 is inserted in the socket 13S, it is possible to read data from the compact flash card 13 into the main unit 1 and write data from the main unit 1 into the compact flash card 13 from the main unit 1. The compact flash card 13 can be used to transfer data or a program between the main unit 1 and another computer. The compact flash card 13 can also be used to store data for backup in terms of setting conditions of the automotive information system.

The removable face plate unit 15 includes a control/display unit including a display for displaying various kinds of information for a user and a control unit having control keys used by the user to control the system. The control/display unit serves as digital output means for outputting processed digital data. The face plate unit 15 is also called a DCP (detachable control panel). The display of the face plate unit 15 may be realized by a color LCD (liquid crystal display) with a large size including for example 256×64 dots.

When a user leave his/her car, the user may take the face plate unit 15 with him/her so that even if a burglar tries to steal the automotive information system, the burglar will realize that the system has no value to steal because the display and the control unit are removed from the system and thus he/she will never steal it. After being removed from the main unit 1, the face plate unit 15 may be placed into a case 15a so that it will be protected from damage when the user carries it with him/her.

Although not shown in FIG. 1, the face plate unit 15 also includes an infrared communication unit for communicating with a handheld computer 8 according to the IrDA (infrared Data Association) standard or the like.

1.1.4. Other Components

The GPS antenna 4 is an antenna for receiving a radio wave from a GPS satellite. The signal received via the GPS antenna 4 is supplied via a GPS receiver 4a to the GPS unit (not shown) in the main unit 1. The GPS unit calculates the global position of the receiver on the basis of the radio wave received from the GPS satellite. The car navigation system is realized on the computer using a program, and the we result of the calculation made by the GPS unit is transferred to the car navigation system.

The security control unit 5 serves as a warning system. More specifically, if a sensor 5a detects a vibration or a mechanical shock produced by a burglar or caused by mischief, the security control unit 5 sounds an alarm. The telephone unit 6 includes a telephone antenna 6a and a handset 6b and serves as a mobile telephone.

1.2. Internal Construction of the Main Unit

Figure 3:
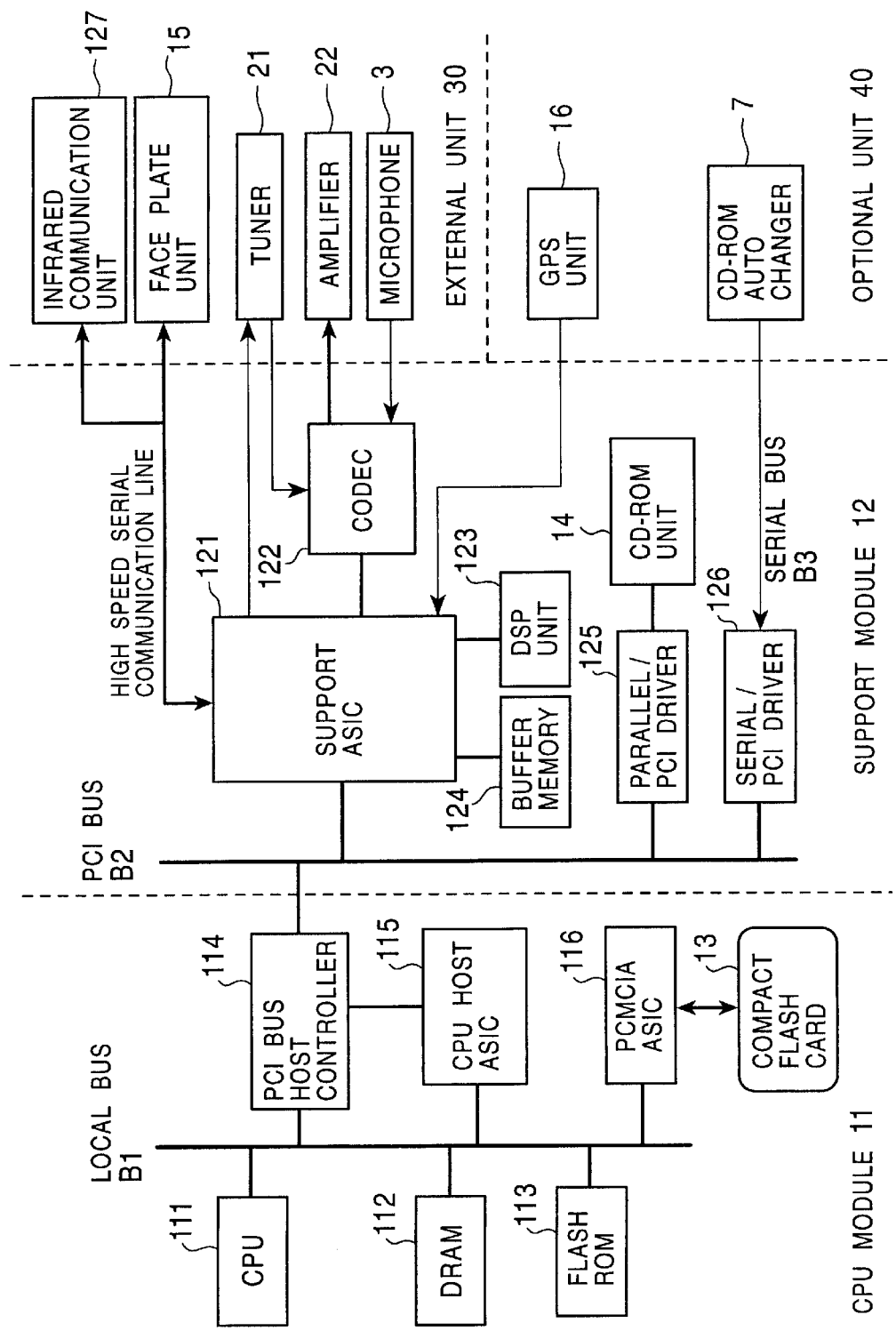
FIG. 3 is a block diagram illustrating the internal construction of a main unit according to the embodiment of the invention.

FIG. 3 is a block diagram illustrating main components of those described above. That is, FIG. 3 illustrates the internal construction of the main unit 1 and associated elements. FIG. 3 is divided into four sections by broken lines. The leftmost section is a CPU module 11, the central section is a support module 12, the right and upper section is an external unit 30, and the right and bottom section is an optional unit 40. Of these, the CPU module 11 and the support module 12 are disposed inside the main unit 1.

The external unit 30 and the optional unit 40 are described in a generic fashion. In a practical system, the external unit 30 and the optional unit 40 may each include a plurality of devices connected to the main unit 1. In FIG. 3, for convenience of description, the compact flash card 13 is shown at the bottom of the CPU module 11 and the face place unit 15 in shown on the top of the external unit 30.

The CPU module 11 and the support module 12 form a computer responsible for control over the entire automotive information system. The CPU module 11 serves to perform logical operations using the CPU 111 and associated elements. The support module 12 involves the operations of inputting and outputting data from and to other devices in the automotive information system.

In the CPU module 11, data is transmitted via a local bus B1 (first bus) which extends from the CPU 111 to various devices. On the other hand, in the support module 11, data is transmitted via a PCI (Peripheral Component Interconnect) bus B2 (second bus) which connects various devices.

1.2.1. Construction of the CPU Module

The local bus Bi of the CPU module 11 is of the type acceptable by the CPU 111. The local bus Bi is connected to a DRAM 112, a flash ROM 113, a PCI bus host controller 114, a CPU host ASIC 115, and PCMCIA-ASIC 116. The DRAM 112 provides a work area or a variable area used by the CPU 111 to control the automotive information system.

The flash ROM 113 is an erasable ROM for storing software such as an OS, BIOS, and application program. The OS stored in the flash ROM 113 servers to manage resources on the computer and control the inputting and outputting operations including those for a user interface. The OS also executes a program in a predetermined form. A specific example of the OS is Windows CE (trademark of Microsoft Corp.) or a similar OS based on Windows CE.

The PCI bus host controller 114 connects the local bus B1 to the PCI bus B2 and servers to convert the format of data transferred between these two buses.

ASICs (Application Specific Integrated Circuits) such as a CPU host ASIC 115 refers to ICs or LSIs designed for use in specific applications, as opposed to ROMs, RAMs, or CPUs which are designed for general purposes. More specifically, the CPU host ASIC 115 servers as an interface between the local bus B1 and the PCI bus host controller 114. That is, the CPU host ASIC 115 serves as a "window" through which data is transferred between the PCI bus B2 and the CPU module 11. More specifically, the CPU host ASIC 115 involves conversion of address format, interrupt handling, and bus arbitration. The CPU host ASIC 115 also interfaces, in place of the CPU 111, the CPU module 11 with an external device. Furthermore, the CPU host ASIC 115 determines whether data received via the PCI bus B2 should be transferred to the CPU 111.

The CPU host ASIC 115 transfers data, which is determined to be transferred to the CPU 111, to the CPU 111 via the local bus B1. The CPU host ASIC 115 properly responds to other data. For example, when the received data does not need any particular operation by the CPU 111 but needs only a simple predetermined response, the CPU host ASIC 115 returns the predetermined simple response.

The PCMCIA-ASIC 116 serves as an interface for the compact flash card 13 to read and write data in accordance with the PCMCIA (Personal Computer Memory Card international Association) standard.

1.2.2. Construction of the Support Module

The PCI bus B2 of the support module 12 is a bus for transferring data among various devices in the automotive information system. That is, the PCI bus B2 serves as transferring means for transferring, in digital form, audio data or digital data received from a device. The devices connected to the PIC bus B2 include external units 30 and optional units 40. The external units 30 and the optional units 40 may each include various units.

More specifically, the external units 30 are those units disposed separately from the main unit 1 shown in FIG. 1 and the external units 30 include the face plate unit 15 removable from the main unit 1, the tuner 21 and the amplifier 22 disposed in the tuner/amplifier unit 2, and the microphone 3. Of these external units, the face plate unit 15 has an infrared communication unit 127.

The optional units 40 are those units which are optionally incorporated into the automotive information system. In this specific example, the optional units 40 include the GPS unit 16 and the auto CD-ROM changer 7. The main unit 1 also includes a CD-ROM unit 14 disposed therein. The CD-ROM unit 14 is also connected to the PCI bus B2. The CD-ROM unit 14 serves as a player used to read audio data or digital data from a music CD or a CD-ROM. Both the auto CD-ROM changer 7 and the CD-ROM unit 14 have the capability of reading data from both types of CDs, that is music CDs and CD-ROMs. That is, they are compatible between music CDs and CD-ROMs.

In order to transfer data among the above-described various devices in the support module 12, a support ASIC 121, a CODEC 122, a DSP unit 123, a buffer memory 124, a parallel/PCI driver 125, and a serial/PCI driver 126 are used.

The support ASIC 121 serves to determine which data should be transferred to which device in the support module 12. In other words, the support ASIC 121 serves as a traffic controller. The CODEC (Coder/Decoder) 122 converts digital data to analog data and conversely analog data to digital data.

That is, the CODEC 122 serves as an A/D converter for converting an analog signal received from some device into digital audio data and also serves as a D/A converter for converting processed audio data to an analog signal. The CODEC 122 and the amplifier 22 for driving a loudspeaker in accordance with the analog signal converted from digital data form audio output means for outputting processed audio data in the form of an analog signal.

The DSP (Digital Sound Processor) unit 123 is a circuit for processing a digital sound signal. More specifically, when audio data representing music or the like is given, the DSP unit 123 processes the given audio data so that various conditions set in the system in terms of a left-right balance, volume, fading, surround-sound effect, equalizing, etc., are reflected on the audio data.

The buffer memory 124 handles the difference in data read/write cycle between the PCI bus B2 and devices such as a CD-ROM unit by storing and reading data at proper rates. An SRAM or the like may be employed as the buffer memory 124.

The parallel/PCI driver 125 converts parallel-form audio data or digital data received from the CD-ROM unit 14 into a data format acceptable by the PCI bus B2. The serial/PCI driver 126 converts serial audio data or digital data in the USB data format received from the auto CD-ROM changer 7 into a data format acceptable by the PCI bus B2.

The face plate unit 15 including the infrared communication unit 127 is connected to the support ASIC 121 via a high-speed serial communication line. The GPS unit 16 is connected to the support ASIC 121 via a serial start-stop synchronization communication line such as an UART (Universal Asynchronous Receiver-Transmitter). The CD-ROM unit 14 is connected to the parallel/PCI driver 125 via a parallel communication line such as an ATAPI (AT Attachment Packet Interface). Although not shown in the figure, the infrared communication unit 127 includes an ASIC involving transmission and reception of data via an infrared ray.

The CPU module 11, the CODEC 122, the DSP unit 123, and the buffer memory 124 of the support module 12 form processing means for processing digital data and also audio data in digital form.

1.2.3. Construction of Buffer

Figure 4:
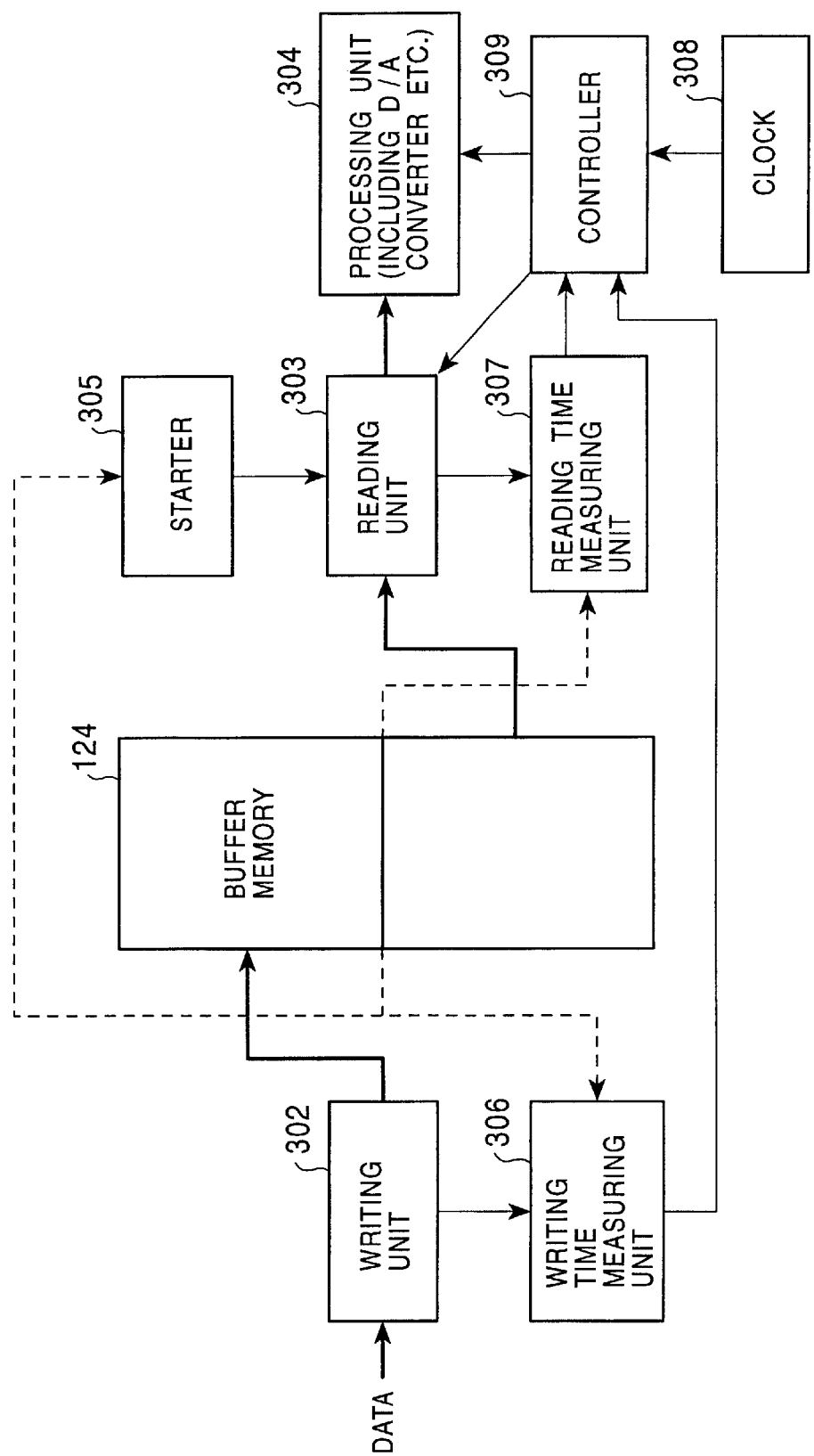
FIG. 4 is a block diagram conceptually illustrating the construction of a buffer memory and associated elements according to the embodiment of the invention.

FIG. 4 is a block diagram conceptually illustrating the construction of the buffer memory 124 described above and associated elements. Of those elements shown in FIG. 4, the buffer memory 124 corresponds to the buffer memory 124 shown in FIG. 3, and the processing unit 304 corresponds to the audio data processing section including the DSP unit 123, the CODEC 122, and the amplifier 22 shown in FIG. 3. The clock 308 is not shown in FIG. 3. The other elements are implemented by the support ASIC 121 shown in FIG. 3.

In addition to the buffer memory 124, in the present embodiment, there are also provided associated elements including a writing unit 302, a reading unit 303, a processing unit 304, a starter 305, a writing time measuring unit 306, a reading time measuring unit 307, a clock 308, and a controller 309.

Of these elements, the buffer memory 124 serves to store given data. The writing unit 302 writes given data into the buffer memory 124. The reading unit 303 reads data from the buffer memory 124. The processing unit 304 processes the data read from the buffer memory 124.

In the present embodiment, when data has been written into the buffer memory 124 such that the first half storage area of the buffer memory 124 has become filled with the data or when data has been read from the buffer memory 124 by an amount equal to a half the full capacity of the buffer, a signal circuit notifies the starter 305, the writing unit 306, and the reading unit 307 of that fact. This signal circuit is denoted by broken arrows in FIG. 4.

The starter 305 makes the reading unit 303 start reading data when data has been written into the buffer memory 124 such that the first half storage area of the buffer memory 124 has become filled with the data. The writing time measuring unit 306 measures the time (writing time) required to write data into the buffer memory starting from the first storage location, at the smallest address to the exact middle storage location of the buffer memory. The reading time measuring unit 307 measures the time (reading time) required to read data from the buffer memory 124 starting from the first storage location by an amount equal to a half the full capacity of the buffer memory 124.

The clock 308 provides a clock signal using a quartz oscillator or the like. The controller 309 controls the rate at which data is read from the buffer memory 124 in accordance with the relationship between the above-described writing time and reading time.

The controller 309 controls the above-described rate by dividing the clock signal supplied from the clock 308 by a properly selected divisor. When the rate at which data is written into the buffer memory 124 is lower than the rate at which data is read from the buffer memory 124, the controller 309 reduces the divisor. Conversely, when the rate at which data is written into the buffer memory 124 is higher than the rate at which data is read from the buffer memory 124, the controller 309 increases the divisor.

The buffer memory 124, the writing unit 302, and the reading unit 303 are constructed such that writing and reading of data can be performed simultaneously and concurrently by means of a direct memory access (DMA) technique. The controller 309 sends commands to both the reading unit 303 and the processing unit 304 to control the rate at which data is read from the buffer memory 124. The control process may be accomplished in various manners. For example, only one of the reading unit 303 and the processing unit 304 is controlled and the other unit is made to operate in synchronization with the former unit.

2. Operation

The operation is now described below.

2.1 General Operation 2.1.1. Inputting Data

Of data input from various devices, data in digital form is directly input to the support ASIC 121 of the support module 12. For example, the face plate unit 15 transmits data indicating which key is pressed. On the other hand, the GPS unit 16 transmits digital data representing the latitude and longitude calculated on the basis of a radio wave received from a GPS satellite. The infrared communication unit 127 of the face plate unit 15 transmits digital data transferred from the handheld computer 8 via an infrared ray.

From the CD-ROM unit 14 and the auto CD-ROM changer 7, audio data or sound data read from a music CD or CD-ROM data in digital form read from a CD-ROM is transmitted to the support ASIC 121 via the PCI bus B2 after being converted by the parallel/PCI driver 125 or the serial/PCI driver 126 into the data format acceptable by the PCI bus B2.

Although not shown in FIG. 3, the security control unit 5 shown in FIG. 1 transmits digital data indicating the occurrence of an emergency. The telephone unit 6 transmits digital data indicating the arrival of a call and the telephone number of the caller in the form of characters. During a telephone conversation, the telephone unit 6 transmits audio data representing the voice of the caller to the support ASIC 121.

Because the security control unit 5 and the telephone unit 6 are connected to the serial/PCI driver 126 via the USB bus, that is, the serial bus B3 in the daisy chain fashion, information from the security control unit 5 or the telephone unit 6 is transmitted, as audio data or digital data from the auto CD-ROM changer 7, to the main unit 1 via the serial bus B3 and then converted by the serial/PCI driver 126 into the data format acceptable by the PCI bus B2. After that, the information is transferred to the support ASIC 121 via the PCI bus B2.

Of the data input from various devices, analog signals are first input to the CODEC 122 and converted into digital form, and then transferred to the support ASIC 121. For example, an analog signal representing a voice of a user is input from the microphone. On the other hand, from the tuner 21, an analog signal representing radio broadcasting contents tuned by the tuner 21 is input.

2.1.2. Transferring Data from the Auto CD-ROM Changer

In the auto CD-ROM changer 7, audio data read from a music CD is converted by the ATAPI decoder 707, as for the digital data read from the CD-ROM, into output data in the ATAPI format. The resultant output data in the ATAPI format is transferred by the USB controller 711 to the main unit 1 in an isochronous fashion via the upstream connector 714.

Audio data read from a music CD is divided into 75 frames per sec wherein each frame contains an amount of data of 2353 bytes. Because each frame has a width equal to 1 sec/75 frames or about 13.3 sec, the ATAPI-format audio data from the auto CD-ROM changer 7 is transmitted by an amount of 2352 bytes at a time at equal intervals of 13 ms or 14 ms via the USB.

2.1.3. Destination of Input Data

As described above, the auto CD-ROM changer 7 reads data from a CD and the resultant data is transmitted to the support ASIC 121 of the main unit 1. The support ASIC 121 also receives information from various devices and determines which information is transferred to which device. In general, the support ASIC 121 process sound data with the DSP unit 123 and transmits the processed sound data to the amplifier via the CODEC 122. On the other hand, the support ASIC 121 transmits data other than sound data to the CPU module 11. However, of sound data, the data input via the microphone 3 is transmitted to the CPU module 11 for voice recognition.

Sound data to be transmitted to the amplifier 22 includes radio broadcasting data tuned by the tuner 21, data representing recorded contents read from a music CD by the CD-ROM unit 14 or the auto CD-ROM changer 7, and a caller's voice from the telephone unit 6.

Data other than sound data includes data indicating which key of the face plate unit 15 is pressed, data such as file data from the infrared communication unit 127, digital data representing the latitude and longitude from the GPS unit 16, car navigation map data and associated area information read from a CD-ROM by the CD-ROM unit 14 or the auto CD-ROM changer 7, alarming data from the security control unit 5, and data transmitted from the telephone unit 6 to indicate the arrival of a call or the telephone number of the caller.

2.1.4. Information Processing by the CPU Module

If the CPU module 11 receives data in digital form from the support ASIC 121, the PCI bus host controller 114 converts the received data into the data format acceptable by the local bus B1 and transfers the resultant data to the CPU host ASIC 115. The CPU host ASIC 115 manages the inputting/outputting operations for the CPU 111. If the CPU host ASIC 115 receives data, it determines whether the received data should be transferred to the CPU 111 on the basis of the data format or other information.

For data which needs only a simple predetermined response, the CPU host ASIC 115 returns the predetermined response to the support module 12 via the PCI bus host controller 114. The CPU host ASIC 115 transfers the other data to the CPU 111.

In accordance with the OS codes or program codes stored in the flash ROM 113, the CPU 113 processes the received data using the DRAM 112 as a work area. For example, if a user's voice is received from the microphone, the CPU 111 compares the user's voice with prepared parameters or waveforms representing features of commands. The CPU 111 determines that a command most similar to the user's voice is the command issued by the user and performs an operation indicated by the command.

The operation of reading and writing data from and to the compact flash card 13 is performed by the PCMCIA-ASIC 116 of the CPU module 11 under the control of the CPU host ASIC 115 in accordance with a request from the CPU 111.

The result of the information process performed by the CPU 111 is converted by the PCI bus host controller 114 into the data format acceptable by the PCI bus B2 and transmitted to the support module 12. Data which is transmitted, after being subjected to information processing, to the support module 12 includes operation commands to various parts of the support module 12 or to various devices. The support module 12 performs various processes such as an inputting/outputting process in accordance with the received data.

2.1.5. Processes such as an Inputting/Outputting Process in the Support Module

For example, if the command received from the CPU module 11 indicates that data should be read from a CD or that the radio device should be tuned to a particular frequency, the CD-ROM unit 14, the auto CD-ROM changer 7, or the tuner 21 operates in accordance with the received command. On the other hand, if a command indicating that the source of the sound radiated by the loudspeaker should be switched to a source by another device is received from the CPU module 11, the support ASIC 121 switches the audio data being transmitted to the CODEC 122 to the audio data supplied by the designated device.

When audio data in digital form is output to the amplifier 22 which accepts only data in analog form, the audio data in digital form is supplied to the amplifier 22 after being converted into analog form by the CODEC 122.

Data to be displayed to inform a user is transmitted to the support ASIC 121 from the CPU module 11 or another device, the support ASIC 121 transfers the data to be displayed to the face plate unit 15 via the high-speed serial communication line. The face plate unit 15 displays information in accordance with the received data.

Now, specific examples of manners in which the user uses the automotive information system with various parts described above.

2.2. Controlling the Automotive Information System and Displaying Information

To operate the automotive information system according to the present embodiment, the user may press a proper one of control keys provided on the face plate unit 15 or may give a voice representing one of predetermined words corresponding to respective operations. For example, when the user wants to use the CD or the FM tuner, the user may press a control key indicating the CD or the FM tuner or may pronounce a predetermined word such as a "CD" or "FM" so that the pronounced word is input to the microphone 3.

When the user presses some control key, the corresponding data is generated and transferred from the support ASIC 121 to the CPU module 11. The CPU 111 transmits new corresponding data to be displayed to the support ASIC 121. According to this data, the display of the face plate unit 15 provides a screen for use in controlling the radio or CD device.

For example, if the user pronounces "CD", then an analog signal is transmitted from the microphone 3 to the CODEC 122 and the CODEC 122 converts the received analog signal to audio data in digital form. The resultant audio data is transmitted from the support ASIC 121 to the CPU 111 via the PCI bus host controller and the CPU host ASIC 115. The CPU 111 determines which word was pronounced by the user on the basis of the received audio data in digital form, and performs an operation in accordance with the word determined, in a similar manner to that which will be performed when a corresponding control key is pressed.

The display of the face plate unit 15 may be constructed in the form of a touch panel so that the touch panel serves as a graphical user interface of a computer. For example, icons representing available functions are displayed on the display so that if the user touches some icon with his/her finger, the corresponding function is activated. The voice recognition may be combined with icons. For example, when a plurality of icons are displayed on the screen, if the user pronounces "next", then the screen will be switched such that another set of icons are displayed. If the user pronounces "return", then the screen will return to the previous state.

2.3. Listening to Radio

When the user pronounces "FM" to select an FM radio broadcast, if the CPU 111 recognizes the voice given by the user, the CPU sends a corresponding command to the support ASIC 121. In response to the command, the support ASIC 121 switches the tuner 21 into a state in which the FM radio broadcast is received, and switches the data source supplied to the amplifier 22 to the audio data from the tuner 21. In this case, the tuner 21 may receive a channel at the same frequency as the previously selected one or may seek, if the user further pronounces for example "seek up", a frequency at which another broadcast can be received in good conditions, while gradually sweeping the frequency.

In the case where a radio broadcast is listened to, because the signal transmitted from the tuner 21 is of analog form, the signal is input to the CODEC 122 and converted to audio data in digital form. The resultant audio data in digital form is sent to the support ASIC 121. The support ASIC 121 transfers the audio data received from the CODEC 122 to the DSP unit 123. The DSP unit 123 processes the received audio data in accordance with conditions such as the valance and volume set in advance in the system. The resultant audio data is returned to the support ASIC 121.

The support ASIC 121 returns the received audio data to the CODEC 122. The CODEC 122 converts the digital audio data into analog form and transmits the resultant audio data in analog form to the amplifier 22 which in turn radiates a sound via the loudspeaker.

2.4. CD Playback Operation

When the user wants to listen to a music CD, the user may set a music CD into the CD-ROM unit 14 or the auto CD-ROM changer 7 and may issue a play start command by pronouncing for example "start" or may issue a skip command to jump to next music. For example, when a music CD which is set in the CD-ROM unit 14 is reproduced, the CD-ROM unit 14 operates in response to a command from the support ASIC 121 and thus audio data in digital form is transmitted from the CD-ROM unit 14.

The parallel/PCI driver 125 converts the audio data into a data format acceptable by the PCI bus B2 and transmits the resultant data to the support ASIC 121. The support ASIC 121 transfers the audio data received via the PCI bus B2 to the DSP unit 123. The DSP unit 123 processes the received audio data and returns the processed audio data to the support ASIC 121. The support ASIC 121 transfers the processed audio data to the CODEC 122 via the digital input/output port. The audio data is finally output in analog form from the amplifier 22.

In the case where a music CD which is set in the auto CD-ROM changer 7 is reproduced, audio data in the ATAPI format is serially transmitted from the auto CD-ROM changer 7 via the USB or the serial bus B3. The serial/PCI driver 126 converts this data into a data format acceptable by the PCI bus B2. After that, the operation is performed in a similar manner to the case where a music CD which is set in the CD-ROM unit 14 is reproduced.

When the CD-ROM unit 14 and the auto CD-ROM changer 4 are compared with the CODEC 122 and the DSP unit 123, whereas the former two devices transmit a large amount of data in long cycles, the latter two devices process data little by little in short cycles. Thus, there is a difference in operation cycles. Furthermore, because their operations are based on different clock signals, there can be a difference in the operation speed or the processing rate.

To avoid the above problem, the support ASIC 121 temporarily stores, into the buffer memory 124, a large amount of digital audio data received from the CD-ROM unit 14 or the auto CD-ROM changer 7, and sequentially reads data from the buffer memory 124 in a first-in first-out fashion so that reproduction is accomplished in a highly reliable fashion without encountering an error.

2.5 Operation of the Buffer

The buffer memory 124 is used in the manner as described below. When a CD is reproduced using the auto CD-ROM changer 7, audio data read from the CD is transmitted in data blocks or frames of 2353 bytes at intervals of 13 ms or 14 ms, that is, at a rate of 74 frames per sec. Blocks of data received are accumulated in the buffer memory 124. The audio data read from the CD is of the form sampled at a frequency of 44.1 KHz and thus reading data from the buffer memory 124 should be performed at a frequency or a rate corresponding to the above-described sampling frequency.

2.5.1. Starting Writing Data

When the writing unit 302 receives first audio data, the writing unit 302 informs the writing time measuring unit 306 of the arrival of the first audio data. In response, the writing time measuring unit 306 starts measuring the writing time. Upon receiving the first audio data, the writing unit 302 writes the first audio data into the buffer memory 124. When the first audio data has arrived, the writing pointer of the writing unit 302 points to a smallest address of the buffer memory 124. Each time the writing unit 302 receives audio data, the writing unit 302 writes the received audio data, by means of the DMA technique, into a memory area of the buffer memory 124 starting from the address pointed to by the writing pointer. After that, the value of the writing pointer is updated so that the address immediately following the above-described memory area is pointed to. The above-described process is performed repeatedly.

After the writing unit 302 started writing the audio data into the buffer memory 124, the reading unit 303 does not start reading the audio data from the buffer memory 124 until the address pointed to by the writing pointer of the writing unit 302 reaches the midpoint of the buffer memory 124.

2.5.2. Finishing the Writing Time Measurement and Starting Reading Data

If the value of the writing pointer of the writing unit 302 reaches the midpoint of the buffer memory 124, a signal indicating this fact is sent to the writing time measuring unit 306 and also to the starter 305. Upon receiving this signal, the writing time measurement unit 306 terminates the measurement of the elapsed time since the start of writing the audio data. Thus, the writing time measurement is completed. On the other hand, if the starter 305 receives the above-described signal, the starter 3 makes the reading unit 303 start reading audio data from the buffer memory 124.

The rate at which the audio data is read from the buffer memory 124 is controlled by the controller 309 via the reading unit 303 and the processing unit 304. The reading rate is controlled in accordance with the relationship between the writing time and the reading time. However, at the time when the reading unit 303 starts reading audio data from the buffer memory 124, the reading time is not known yet although the writing time is already known. Therefore, the controller 309 makes the reading unit 303 and the processing unit 304 start reading the audio data at a predetermined default rate.

When the reading unit 303 starts reading audio data from the buffer memory 124, the reading unit 303 sets the reading pointer at the smallest address of the buffer memory 124 and reads a predetermined amount of audio data starting from that address by means of the DMA technique. The audio data read is transferred to the processing unit 304. If the reading unit 303 starts reading audio data from the buffer memory 124, the reading time measuring unit 307 starts measuring the reading time. When the reading unit 303 has read audio data from the buffer memory 124 by an amount equal to a half the full capacity of the buffer memory 124, the reading time measurement is terminated.

2.5.3. Finishing Reading Time Measurement and Controlling the Reading Rate

When the reading time measurement is completed, both the writing time and the reading time become known. Thus, the controller 309 controls the rata at which audio data is read from the buffer memory 124, in accordance with the relationship between the writing time and the reading time. More specifically, the controller 309 divides the clock signal at a frequency of 48 MHZ or the like by a divisor N using a frequency divider so that the operating frequency becomes equal to for example the sampling frequency of 44.1 KHz.

The controller 309 adjusts the operation rate of the reading unit 303 and the processing unit 304 by increasing or decreasing the divisor N depending on the relationship between the writing time and the reading time. The writing time is inversely proportional to the rate at which audio data is written into the buffer memory 124 and the reading time is inversely proportional to the rate at which audio data is read from the buffer memory 124.

This means that when the reading time is shorter than the writing time, the rate at which given data is written is lower than the rate at which data is read. In this case, the divisor N is reduced so that the operation rate of the device which processes the data decreases to a lower value corresponding to the rate of the device which supplies the data. On the other hand, when the reading time is longer than the writing time, the rate at which given data is written is higher than the rate at which data is read. In this case, the divisor N is increased so that the operation rate of the device which processes the data increases to a greater value corresponding to the rate of the device which supplies the data.

When the difference between the writing rate and the reading rate is great, the divisor N is varied to a great degree. Conversely, when the difference between the writing rate and the reading rate is small, the divisor N is slightly varied. By varying the divisor N in the above-described manner depending on the degree of the difference, it becomes possible to control the rate in a quick and precise fashion.

During the audio data processing, the above-described process of measuring the writing and reading times and adjusting the reading rate on the basis of the measurement result may be performed a large number of times so that the data processing device can operate at the same rate as that of the data supplying device without having to have a common clock signal.

2.6 Using a CD-ROM and the Car Navigation Capability

When the user wants to use the car navigation capability, the user sets a CD-ROM containing car navigation data (application software, map data) into the auto CD-ROM changer 7 or the CD-ROM unit 14, and then the user starts the car navigation capability. The car navigation capability may be implemented by installing a computer program in the flash ROM 113 of the CPU module 11 so that car navigation is performed by the CPU 111 according to the program.

When the car navigation system needs map data or associated area information stored on the CD-ROM, map data or associated area information in digital form is read from the auto CD-ROM changer 7 or the CD-ROM unit 14 and transferred to the CPU 111 via the parallel/PCI driver 125, the PCI bus host controller 114, and the CPU host ASIC 115. On the basis of the map data and the associated area information received, the CPU 111 produces, on the DRAM 112, a bit map image to be displayed on the display of the face plate unit 15. The resultant bit map image is transmitted to the support module 12.

When the car navigation system is being used, the system receives radio waves from GPS satellites via the GPS antenna 4 and the GPS unit 16 shown in FIG. 3 calculates the latitude and the longitude from the received radio waves. The result is supplied to the CPU 111. On the basis of the data on the latitude and the longitude, the CPU 111 determines the current position of the car with the automotive information system and indicates the determined position on a map. This allows the current position to be set as a starting point without needing a user's manual operation. It also becomes possible to display a map centered at the current position. A Mark indicating a next turning point may also be displayed.

The navigation data may also be stored in the compact flash card 13 (or DRAM 112) or the flash ROM 113.

The controlling method using the voice recognition may also be employed in the car navigation system. For example, when the car navigation system has the capability of providing a turn direction indicating whether to make a turn to left or right at each crossing, the user may pronounce "previous" or "next" to get a previous or next turn direction. In response, the car navigation system will switch the turn direction displayed.

The navigation guide may be given to the user by providing a synthetic voice via the amplifier 22. This makes it unnecessary for the user to view the display to know at which crossing he/her should make a next turn.

2.7. Using the Telephone

When the telephone unit 6 is used, the user can enjoy the advantages of the combination of the computer and the automotive information system. For example, the user may store names and their telephone numbers in the DRAM 112, compact flash card 12, or the like using a computer program.

When a telephone call arrives, digital data indicating the arrival of the telephone call and digital data indicating the telephone number of the caller are transmitted from the telephone unit 6 to the support ASIC 121 via the serial bus B3 and the serial/PCI driver 126. These data are further transferred to the CPU 111 of the CPU module 11. The CPU 111 checks the registered telephone numbers to determine whether the telephone number of the present caller is included in the registered telephone numbers.

If the telephone number of the present caller is found in the registered telephone numbers, the CPU 111 returns the name corresponding to the telephone number to the support module 12 thereby displaying the name of the caller on the face plate unit 15 or giving a voice guide saying "Mr/Ms XXX is calling you" via the loudspeaker provided in the car. This allows the user to know who is calling him/her.

When the user is informed of the arrival of the call via the display, the voice guide, or the ringing sound, if the user pronounces a predetermined word to receive the incoming call, the voice of the caller will be provided via the loudspeaker and the voice of the user input via the microphone 3 will be converted into digital audio data by the CODEC 122 and transmitted to the telephone unit 6 via the support ASIC 121, the serial/PCI driver 126, and the serial bus B3. Thus, the user can make a telephone conversation in a hands-free fashion without needing a manual operation.

In the specific example described above, the main unit 1 acts as the data supplying device for supplying voice data of the user and the telephone unit 6 acts as the data processing device. Conversely, in terms of the voice of the caller, the telephone unit 6 acts as the data supplying device and the main unit 1 acts as the data processing device. The main unit 1 and the telephone unit 6 operate in accordance with different clock signals to convert voice data between digital and analog forms or convert digital data between different formats. In this case, it is also possible to precisely adjust the processing rate of the data processing device relative to the rate of the data supplying device thereby ensuring that the process is performed in a highly reliable manner and improved sound quality is obtained.

When a telephone call arrives, if the user does not respond to the call until ringing has been sounded a predetermined times, then a machine-answering function provided in the telephone unit 6 or the CPU module 11 is activated to respond to the call.

When the user makes a telephone call, registered names and corresponding telephone numbers may be sequentially displayed on the screen so that the user may designate a particular name the user wants to make a call to, by touching a telephone call icon with a finger. In response, digital data representing that telephone number is transmitted from the CPU module 11 to the telephone unit 6 and a telephone call is automatically made. If the called person responds to the call, the user can have a telephone conversation.

The user may also pronounce one of registered names to make a telephone call. The CPU module 11 analyzes the user's voice by means of voice recognition to determine whom the call should be made to, and dials the corresponding telephone number. Alternatively, the user may pronounce a telephone number digit by digit to input the telephone number into the system. Furthermore, the user may pronounce "redial" to designate a particular telephone number the user wants to call.

2.8. Using the Security Control Unit

The security control unit 5 may be used either separately from the other devices or in cooperation with the telephone unit 6. For example, when the user leaves his/her car, the user may activate the security control unit 5 and take the transmitter 5c with him/her. If someone unauthorized touches a door knob or a keyhole or tries to open a door or trunk or if someone unauthorized tries to move the car, then a resulting mechanical shock or vibration is detected by the sensor 5a and an alarm signal is transmitted from the sensor 5a to the security control unit 5. In response, the security control unit 6 sounds a loud alarm thereby giving an alarm to people outside the car.

When the user wants to deactivate the security control unit 5, the user may operate the transmitter 5c so as to transmit a predetermined secret command to the security control unit 5. If the security control unit 5 is deactivated, no alarm is sounded when a key is operated or the car is moved.

The security control unit 5 may be used in cooperation with the telephone unit 6 to take a further advantage. When the sensor 5a detects something abnormal, the security control unit 5 not only sounds an alarm but also sends an interrupt signal so as to activate the automotive information system including the CPU module 11 and the servo module 12. Activating the automotive information system may be accomplished by preparing an electronic circuit connected to the power supply and the starting switch of the automotive information system, wherein the electronic circuit always monitors the arrival of an interrupt signal. Upon receiving an interrupt signal, the electronic circuit immediately turns on the power supply and the starting switch thereby activating the automotive information system.

If the CPU 111 activated in the above-described manner receives an alarm signal from the security control unit 5, the CPU 111 sends a command to the telephone unit 6 to make a telephone call to a predetermined destination. The predetermined destination of the telephone call may be, for example, the police, a portable telephone of the user, a security company, etc. If the telephone call is responded to by a called party, a synthetic voice or a recorded human voice telling the occurrence of an emergency is sent to the called party. This allows a person to rush to the place.

2.9. Using Utility Programs

As in common handheld computers, the OS or application program may provide various functions such as an address list, a calendar, schedule management, voice recording, a clock, a calculator, and a game, which will be used by the user in his/her car. The user may add, delete, and/or update application programs so as to establish the information processing environments in a desired fashion.

2.10. Using the Compact Flash Card

In the automotive information system according to the present embodiment, it is possible to send and receive information to and from another automotive information system or handheld computer via the compact flash card 13.

For example it is possible to add a new function or update the OS by reading a new application program or an OS from the compact flash card 13 into the flash ROM 113. If a general-purpose OS is employed, it is possible to easily get various application programs and functional modules of the OS developed by software vendors. In this case, the user can easily get a compact flash card 13 on which a desired program is stored. This allows the user to use the automotive information system as a computer in a more convenient fashion.

Personal data such as an address list produced on another personal computer or handheld computer may be transferred into the automotive information system via the compact flash card 13. This allows the user to continue his/her job on the automotive information system. Conversely, data produced on the automotive information system may be transferred into another personal computer or handheld computer via the compact flash card 13 to continue the job.

Data produced using the utility program may be copied in the compact flash card 13 for backup. When data on the automotive information system is lost by a failure of the system or lost by somebody's operation, the data may be restored into the main unit 1 from the compact flash card 13. This allows the user to continue his/her job.

Data indicating various conditions set by the user on the automotive information system may be stored in the compact flash card 13 for backup. If the setting conditions are varied by somebody, the user may resetting the conditions back to his/her conditions by inserting the compact flash card 13 into the main unit 1 and restoring the contents of the compact flash card 13 into the main unit 1. This allows the user to again use the automotive information system under his/her desired conditions.

2.11. Communicating with the Handheld Computer

In this embodiment, the infrared communication unit 127 may be used to communicating with the handheld computer 8. This allows the user to easily transmit and receive data to and from the handheld computer 8 without having to insert the compact flash card 13 or without having to make a connection to the handheld computer via a cable. Thus, the user can update the OS or an application program using a file stored on the handheld computer 8. The user can also transfer personal data produced on the automotive information system to the handheld computer 8. This allows the personal data to be stored in the handheld computer 8 for backup taking the advantage of a rather great storage capacity of the handheld computer 8. Furthermore, the user may transfer the data indicating the setting conditions of the automotive information system into an automotive information system on another car via the handheld computer 8.

3. Advantages

In the present invention, as described above with reference to specific embodiments, data is read from the buffer memory 124 at a rate precisely adjusted relative to the rate at which data is supplied, and the data is processed without encountering any problem regardless of the difference in operating speed between the data supplying device and the data processing device due to a difference in the clock signal. Thus, the device which processes audio data can operate at the same rate as the operation rate of the device which supplies the audio data. This allows the data supplying device and the data processing device to be constructed separately from each other without causing them to have a problem in operation. Furthermore, as described above, the timing of starting to read data is determined in such a simple manner that when data has been written into the buffer memory 124 such that the first half storage area has become filled with the data, the operation of reading data from the buffer is started. Furthermore, the rate at which data is processed is controlled on the basis of the times required to write and read the same amount of data.

Furthermore, in the present embodiment, the processing rate of the automotive information system may be precisely controlled by simply increasing or reducing the divisor by which the clock signal is divided. Still furthermore, in the present embodiment, it is possible to read and write data from and to the buffer memory 124 at a high rate by means of direct memory access (DMA). This makes it possible to process, in a highly reliable fashion, a large amount of data per unit time, such as audio data read from a music CD, received from another unit via a cable.

Furthermore, in the present embodiment, when data has been written into the buffer memory 124 until a half the capacity of the buffer memory 124 has become filled with the data, the operation of reading data from the buffer memory 124 is begun starting from the first memory location of the buffer memory 124. Therefore, the distance between the data writing location and the data writing location becomes equal to a maximum possible value which corresponds to a half the full capacity of the buffer memory 124. This minimizes the probability that some data is lost by a delay in supplying data or the probability that the buffer overflows with data due to a change in the writing speed or reading speed.

Still furthermore, in the present embodiment, data is output in the ATAPI format from the disk playback device. This allows both audio data read from a music CD and digital data read from a CD-ROM to be easily processed in a similar manner by means of communication via any of a wide variety of network configurations with an IDE interface using a command packet in a similar manner to the case where a SCSI interface is employed.

Still furthermore, in the present embodiment, the computer responsible for controlling the automotive information system is provided with a general-purpose OS which allows the computer to use the resources such as a CPU and memory to the maximum possible degree. The general-purpose OS also provides a user interface which can be generally used for any program. Furthermore, the user can add, update, and/or modify a program in a predetermined form so as to add or optimize a function so as to make it possible to easily and effectively process audio data or digital data read with the disk playback device. The general-purpose OS also allows the present invention to be easily applied to a wider variety of information processing.

Furthermore, in the present embodiment, whether the data is audio data or digital data, any type of data is transferred in digital form via the USB and processed. This allows the system to have high immunity to noise and high resistance to changes in environments even when the data supplying device and the data processing device are constructed in the form of units separately from each other. Thus, high performance in terms of the sound quality can be achieved.

4. Other Embodiments

The invention is not limited to the embodiment described above. The invention may also be embodied in various manners as described below by way of example. Although in the embodiment described above, the auto CD-ROM changer is employed as the data supplying device, a CD player designed to reproduce data from one CD or a device for reproducing data from another types of storage medium such as a MD may also be employed as the data supplying device.

Furthermore, the present invention is not limited to the process on audio data but may be applied to a wide variety of information processes. That is, the present invention is also useful when applied to information processes in which the data is required to be processed at the same rate as the rate at which the data is supplied, or information processes in which the amount of data is needed to be controlled on a time basis.

Furthermore, although in the embodiment described above, the rate at which data is read is controlled on the basis of the relationship between the data writing time and the data reading time, the data reading rate may also be controlled simply depending on the rate at which data to be written into the buffer is given or depending on the rate at which data is written into the buffer. Still furthermore, although in the embodiment described above, the rate at which data is read is controlled on the basis of the time required to write data into the buffer such that the first half storage area of the buffer becomes filled with the data and also on the basis of the time required to read data from the buffer by an amount one-half the full capacity of the buffer, the rate at which data is read may also be controlled on the basis of the times required to write and read data into and from the buffer by another particular amount such as a quarter the full capacity of the buffer. Alternatively, the rate at which data is read may be controlled on the basis of the mean time intervals at which data is written or read.

Still furthermore, the control of the rate at which data is read may be accomplished by another method instead of dividing the clock signal by the divisor. The DMA technique is not necessarily needed in writing and reading data into and from the buffer. Furthermore, formats and standards such as ATAPI, USB, PCI are described only as examples and other alternative formats and standards may also be employed.

As described in detail above, the present invention provides the advantage that the data processing device can operate at the same rate as that of the data supplying device even when the data processing device and the data supplying device are constructed separately from each other. This allows the overall automotive information system to operate in a highly reliable fashion.

What is claimed is:

1. An information processing apparatus comprising:

a buffer for storing given data;

writing means for writing data into a buffer;

reading means for reading data from the buffer;

starting means for making said reading means start reading data when data has been written into the buffer such that the first half storage area of the buffer has become filled with the data;

writing time measuring means for measuring the writing time required to write data into the buffer starting from the first storage location to the exact middle storage location of the buffer;

reading time measuring means for measuring the reading time required to read the data starting from the buffer from the first storage location to the exact middle storage location of the buffer; and control means for controlling the rate at which data is read from the buffer, in accordance with the relationship between said writing time and said reading time.

2. A method of processing information, comprising the steps of:

writing given data into a buffer;

reading data from the buffer;

starting said reading step when data has been written into the buffer until a half of the buffer has become filled with the data;

measuring the writing time required to write data into the buffer starting from the first storage location to the exact middle storage location of the buffer;

measuring the reading time required to read the data from the buffer starting from the first storage location to the exact middle storage location of the buffer; and controlling the rate at which data is read from the buffer, in accordance with the relationship between said writing time and said reading time.

3. A method of processing information according to claim 2, wherein said control step controls said rate by dividing a given clock by a divisor such that when the rate at which data is written into the buffer is lower than the rate at which data is read from the buffer, the clock is divided by a reduced divisor but the clock is divided by an increased divisor when the rate at which data is written into the buffer is higher than the rate at which data is read from the buffer.

4. An automotive information system comprising a disk playback device for supplying audio data and a main unit for processing the audio data supplied, wherein said main unit comprises:

a buffer for storing given data;

writing means for writing audio data received from said disk playback device into the buffer;

reading means for reading audio data from the buffer;

starting means for making said reading means start reading data when audio data has been written into the buffer such that the first half storage area of the buffer has become filled with the audio data;

writing time measuring means for measuring the writing time required to write audio data into the buffer starting from the first storage location to the exact middle storage location of the buffer;

reading time measuring means for measuring the time required to read the audio data from the buffer starting from the first storage location to the exact middle storage location of the buffer; and control means for controlling the rate at which audio data is read from the buffer, in accordance with the relationship between the said writing time and said reading time.

5. A method of controlling an automotive information system using a disk playback device for supplying audio data and a main unit for processing the audio data supplied, wherein said method performs, in said main unit, a process comprising the steps of:

writing audio data received from said disk playback device into a buffer;

reading audio data from the buffer;

starting said reading step when audio data has been written into the buffer such that the first half storage area of the buffer has become filled with the audio data;

measuring the writing time required to write audio data into the buffer starting from the first storage location to the exact middle storage location of the buffer;

measuring the reading time required to read the audio data from the buffer starting from the first storage location to the exact middle storage location of the buffer; and controlling the rate at which audio data is read from the buffer, in accordance with the relationship between said writing time and said reading time.

6. A storage medium on which an information processing program used by a computer to perform an information process is stored, said information process comprising the steps of:

writing given data into a buffer;

starting reading data from the buffer when data has been written into the buffer such that the first half storage area of the buffer has become filled with the data;

measuring the writing time required to write data into the buffer starting from the first storage location to the exact middle storage location of the buffer;

measuring the reading time required to read the data from the buffer starting from the first storage location to the exact middle storage location of the buffer; and controlling the rate at which data is read from the buffer, in accordance with the relationship between said writing time and said reading time.

7. An information processing apparatus according to claim 1, wherein said control means controls said rate by dividing a given clock by a divisor such that when the rate at which data is written into the buffer is lower than the rate at which data is read from the buffer, the clock is divided by a reduced divisor and the clock is divided by an increased divisor when the rate at which data is written into the buffer is higher than the rate at which data is read from the buffer.

8. An information processing apparatus according to claim 1, wherein at least one of the operation of writing data and the operation of reading data is performed by a direct memory access.

* * * * *